(12) United States Patent
Mayes et al.

(10) Patent No.: US 11,576,397 B2
(45) Date of Patent: Feb. 14, 2023

(54) FROZEN CONFECTION

(71) Applicant: Conopco, Inc., Englewood Cliffs, NJ (US)

(72) Inventors: Daniel Matthew Mayes, Olney (GB); Felix Kwadwo Oppong, Bedford (GB); Loyd Wix, Rushden (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 16/072,371

(22) PCT Filed: Jan. 6, 2017

(86) PCT No.: PCT/EP2017/050249
§ 371 (c)(1),
(2) Date: Jul. 24, 2018

(87) PCT Pub. No.: WO2017/133863
PCT Pub. Date: Aug. 10, 2017

(65) Prior Publication Data
US 2019/0021361 A1 Jan. 24, 2019

(30) Foreign Application Priority Data
Feb. 5, 2016 (EP) ..................... 16154520

(51) Int. Cl.
| A23G 9/28 | (2006.01) |
| A23G 9/34 | (2006.01) |
| A23G 9/46 | (2006.01) |
| A23G 9/44 | (2006.01) |
| A23G 9/32 | (2006.01) |
| A23G 9/38 | (2006.01) |

(52) U.S. Cl.
CPC ............ *A23G 9/28* (2013.01); *A23G 9/34* (2013.01); *A23G 9/44* (2013.01); *A23G 9/46* (2013.01); *A23G 9/327* (2013.01); *A23G 9/38* (2013.01); *A23V 2002/00* (2013.01); *A23V 2200/206* (2013.01); *A23V 2250/612* (2013.01); *A23V 2250/6402* (2013.01)

(58) Field of Classification Search
CPC ............ A23G 2200/08; A23G 2200/14; A23G 9/322; A23G 9/48; A23G 9/28; A23G 9/34; A23G 9/46; A23G 9/327; A23P 20/11; A23P 20/17; A23V 2002/00; A23V 2250/1182; A23V 2200/206; A23V 2250/612; A23V 2250/6402
USPC ........................................ 426/656
See application file for complete search history.

(56) References Cited

U.S. PATENT DOCUMENTS

| 3,483,001 A | 9/1969 | Hollis et al. |
| 3,539,365 A | 10/1970 | Durand et al. |
| 3,826,829 A | 7/1974 | Marulich |
| 3,958,033 A | 5/1976 | Sims et al. |
| 3,968,266 A | 6/1976 | Baugher |
| 3,993,793 A | 11/1976 | Finney |
| 4,140,807 A | 2/1979 | Braverman |
| 4,264,637 A | 4/1981 | Braverman |
| 4,282,262 A | 4/1981 | Blake |
| 4,335,155 A | 6/1982 | Blake |
| 4,421,778 A | 12/1983 | Kahn et al. |
| 4,452,823 A | 5/1984 | Connolly et al. |
| 4,853,243 A | 1/1989 | Kahn et al. |
| 4,954,360 A | 4/1990 | Barnett |
| 5,018,646 A | 5/1991 | Billman et al. |
| 5,384,145 A | 1/1995 | Gonsalves et al. |
| 5,405,054 A | 11/1995 | Thomas |
| 5,690,983 A | 11/1997 | Sponholtz |
| 5,707,677 A | 1/1998 | Gonsalves et al. |
| 5,789,004 A | 4/1998 | Hogan et al. |
| 5,753,294 A | 5/1998 | Savello |
| 5,893,485 A | 4/1999 | McGill |
| 5,925,392 A | 7/1999 | Sponholtz |
| 6,050,451 A | 4/2000 | Hess, III |
| 6,033,711 A | 7/2000 | Gonsalves et al. |
| 6,378,731 B1 | 4/2002 | Klabes |
| 6,423,359 B1 | 7/2002 | Braverman |
| 6,551,647 B1 | 4/2003 | Belli |
| 2001/0046545 A1 | 11/2001 | Jones |
| 2002/0009530 A1 | 1/2002 | DuBois et al. |
| 2003/0003215 A1 | 1/2003 | Huang et al. |
| 2003/0134024 A1 | 7/2003 | Malone |
| 2003/0134025 A1 | 7/2003 | Vaghela et al. |

(Continued)

FOREIGN PATENT DOCUMENTS

| AU | 2014200130 | 1/2014 |
| BE | 1011492 | 10/1999 |

(Continued)

OTHER PUBLICATIONS

Search Report and Written Opinion in PCTEP2017050249 dated Feb. 21, 2017.
Search Report and Written Opinion in EP16154520 dated May 3, 2016.
International Preliminary Report on Patentability in PCT/EP2018/063712 dated Apr. 3, 2019.
Search Report and Written Opinion in EP18209263.5 dated Apr. 16, 2019.
Search Report and Written Opinion in PCTEP2018063713 dated May 24, 2018.
Search Report and Written Opinion in EP17174679 dated Nov. 17, 2017.

(Continued)

*Primary Examiner* — Jyoti Chawla
(74) *Attorney, Agent, or Firm* — Gerard J. McGowan, Jr.

(57) ABSTRACT

Disclosed is a frozen confection comprising freezing point depressants in an amount of from 25 to 35% by weight of the frozen confection, wherein the number average molecular weight $<M>_n$ of the freezing point depressants is from 200 to 250 g mol$^{-1}$, and wherein the freezing point depressants comprise erythritol in an amount of from 0.25 to 5 7% by weight of the frozen confection.

19 Claims, No Drawings

(56) References Cited

U.S. PATENT DOCUMENTS

| | | | |
|---|---|---|---|
| 2004/0047964 A1 | 3/2004 | Groux et al. | |
| 2004/0091597 A1* | 5/2004 | Ghaffari | A23G 9/325 |
| | | | 426/565 |
| 2004/0112078 A1* | 6/2004 | Kateman | A23G 9/045 |
| | | | 62/342 |
| 2004/0151816 A1 | 8/2004 | Nana et al. | |
| 2004/0155045 A1 | 8/2004 | Wild | |
| 2004/0161503 A1* | 8/2004 | Malone | A23G 9/285 |
| | | | 426/101 |
| 2005/0037110 A1* | 2/2005 | Windhab | A23G 9/46 |
| | | | 426/100 |
| 2005/0123666 A1 | 6/2005 | Vaghela et al. | |
| 2005/0271790 A1 | 12/2005 | Aronson et al. | |
| 2005/0276898 A1 | 12/2005 | Pascual et al. | |
| 2006/0093720 A1 | 5/2006 | Tatz | |
| 2006/0141103 A1* | 6/2006 | Heritage | A23G 9/327 |
| | | | 426/100 |
| 2007/0047851 A1 | 3/2007 | Sato | |
| 2007/0071866 A1* | 3/2007 | Cox | A23G 9/38 |
| | | | 426/565 |
| 2007/0116848 A1 | 5/2007 | Aldred | |
| 2007/0275131 A1 | 11/2007 | Bertini et al. | |
| 2007/0275148 A1 | 11/2007 | Judge et al. | |
| 2008/0050495 A1 | 2/2008 | Vieira et al. | |
| 2008/0142529 A1 | 6/2008 | LaGuardia | |
| 2008/0203105 A1 | 8/2008 | Trotman | |
| 2008/0085342 A1 | 10/2008 | Binley et al. | |
| 2009/0026232 A1 | 1/2009 | Charlier et al. | |
| 2009/0208630 A1 | 8/2009 | Koh et al. | |
| 2009/0263555 A1 | 10/2009 | Tapfer et al. | |
| 2009/0311405 A1 | 12/2009 | Marasso | |
| 2009/0311406 A1 | 12/2009 | Tapfer et al. | |
| 2009/0323459 A1 | 12/2009 | Windhab et al. | |
| 2010/0055266 A1 | 3/2010 | Windhab et al. | |
| 2010/0172600 A1 | 7/2010 | Sherrill | |
| 2011/0027423 A1 | 2/2011 | Ellis et al. | |
| 2011/0183041 A1 | 7/2011 | Barniol et al. | |
| 2011/0189367 A1 | 8/2011 | Sagalowicz et al. | |
| 2011/0293813 A1* | 12/2011 | Cavallini | A23C 9/1542 |
| | | | 426/575 |
| 2011/0300264 A1 | 12/2011 | Neta et al. | |
| 2012/0040855 A1 | 2/2012 | Pan et al. | |
| 2012/0096875 A1 | 4/2012 | Ravji et al. | |
| 2012/0096876 A1 | 4/2012 | Ravji et al. | |
| 2013/0011085 A1 | 1/2013 | Umenaka | |
| 2013/0126370 A1 | 5/2013 | DiLiberto | |
| 2013/0136842 A1 | 5/2013 | Ummadi et al. | |
| 2013/0323393 A1 | 12/2013 | Olmos et al. | |
| 2015/0144654 A1 | 5/2015 | D'Agostino | |
| 2015/0158635 A1 | 6/2015 | Gum | |
| 2016/0059995 A1 | 3/2016 | James | |
| 2017/0144800 A1 | 5/2017 | Lucchese | |
| 2017/0332662 A1* | 11/2017 | Judge | A23G 9/327 |
| 2018/0345171 A1 | 12/2018 | Hampton | |
| 2019/0008300 A1 | 1/2019 | Graber | |

FOREIGN PATENT DOCUMENTS

| | | |
|---|---|---|
| CA | 2881730 | 2/2014 |
| CN | 1882250 | 12/2006 |
| CN | 101057628 | 10/2007 |
| CN | 101120716 | 2/2008 |
| CN | 101449735 | 6/2009 |
| CN | 101528052 | 9/2009 |
| CN | 101534652 | 9/2009 |
| CN | 102395281 | 3/2012 |
| CN | 103338649 | 10/2013 |
| CN | 103391724 | 11/2013 |
| CN | 103598399 | 2/2014 |
| CN | 104244727 | 12/2014 |
| EH | WO2005122799 | 12/2005 |
| EP | 0519394 | 12/1992 |
| EP | 941668 | 9/1999 |
| EP | 0941668 | 9/1999 |
| EP | 0965277 | 12/1999 |
| EP | 1072196 | 1/2001 |
| EP | 1106075 | 6/2001 |
| EP | 1342418 | 10/2003 |
| EP | 1415542 | 5/2004 |
| EP | 1449441 | 12/2005 |
| EP | 1650133 | 4/2006 |
| EP | 1676486 | 7/2006 |
| EP | 1757531 | 2/2007 |
| EP | 1964785 | 3/2008 |
| EP | 1926398 | 6/2008 |
| EP | 1691624 | 9/2010 |
| GB | 1446144 | 8/1976 |
| GB | 2418905 | 4/2006 |
| JP | 62244350 | 10/1987 |
| JP | 10117694 | 5/1998 |
| JP | 2007161254 | 6/2007 |
| JP | 2007302318 | 11/2007 |
| JP | 2010280391 | 12/2010 |
| JP | 2011105382 | 6/2011 |
| JP | 201281977 | 4/2012 |
| TW | I265009 B | 11/2006 |
| WO | WO9421137 | 9/1994 |
| WO | WO9421138 | 9/1994 |
| WO | WO9816120 | 4/1998 |
| WO | WO9823169 | 6/1998 |
| WO | WO0106865 | 2/2001 |
| WO | WO0160184 | 8/2001 |
| WO | WO0249451 | 6/2002 |
| WO | WO02058477 | 8/2002 |
| WO | WO02080693 | 10/2002 |
| WO | WO02085130 | 10/2002 |
| WO | WO03009708 | 2/2003 |
| WO | WO03020869 | 3/2003 |
| WO | WO03096821 | 11/2003 |
| WO | WO2004066753 | 8/2004 |
| WO | WO2004091305 | 10/2004 |
| WO | WO2005046346 | 5/2005 |
| WO | WO2005095228 | 10/2005 |
| WO | WO2005096833 | 10/2005 |
| WO | WO2005112656 | 12/2005 |
| WO | WO2005115163 | 12/2005 |
| WO | WO2005115164 | 12/2005 |
| WO | WO2006002025 | 1/2006 |
| WO | WO2006007921 | 1/2006 |
| WO | WO2006045370 | 5/2006 |
| WO | WO2006099987 | 9/2006 |
| WO | WO07039066 | 4/2007 |
| WO | WO2007039064 | 4/2007 |
| WO | WO2007039158 | 4/2007 |
| WO | WO2007093614 | 8/2007 |
| WO | WO2007112504 | 10/2007 |
| WO | WO08009616 | 1/2008 |
| WO | WO2008004162 | 1/2008 |
| WO | WO2008009617 | 1/2008 |
| WO | WO2008009618 | 1/2008 |
| WO | WO2008009623 | 1/2008 |
| WO | WO2008019865 | 2/2008 |
| WO | WO2008046699 | 4/2008 |
| WO | WO2009019088 | 2/2009 |
| WO | WQ2009124821 | 10/2009 |
| WO | WO2010008452 | 1/2010 |
| WO | WO2010012514 | 2/2010 |
| WO | WO2010104573 | 9/2010 |
| WO | WO2010149509 | 12/2010 |
| WO | WO2010149511 | 12/2010 |
| WO | WO2011073035 | 6/2011 |
| WO | WO2012016852 | 2/2012 |
| WO | WO2012072335 | 6/2012 |
| WO | WO2012110376 | 8/2012 |
| WO | WO2012130654 | 10/2012 |
| WO | WO2012152908 | 11/2012 |
| WO | WO2013044049 | 3/2013 |
| WO | WO2013087354 | 6/2013 |
| WO | WO2013092510 | 6/2013 |
| WO | WO2913092495 | 6/2013 |
| WO | WO13109721 | 7/2013 |
| WO | WO2013124193 | 8/2013 |
| WO | WO2014029574 | 2/2014 |

(56) References Cited

FOREIGN PATENT DOCUMENTS

| | | |
|---|---|---|
| WO | WO2015146205 | 10/2015 |
| WO | WO2015152739 | 10/2015 |
| WO | WO2015155634 | 10/2015 |
| WO | WO2016030856 | 3/2016 |
| WO | WO16080419 | 5/2016 |
| WO | WO2016075016 | 5/2016 |
| WO | WO2016075017 | 5/2016 |
| WO | WO2016167660 | 10/2016 |
| WO | WO2017133863 | 8/2017 |
| ZA | 9810254 | 8/1999 |
| ZA | 200104736 | 2/2002 |

OTHER PUBLICATIONS

Search Report and Written Opinion in PCTEP2018063712 dated Aug. 9, 2018.
IPRP1 in PCTEP2017050249 dated Aug. 7, 2018 pp. 1-6.
Search Report and Written Opinion in PCTEP2019079917; dated Jan. 24, 2020.
Chirife et al.; A Simple Model for Predicting the Viscosity of Sugar and Oligosaccharide Solutions; Journal of Food Engineering 1997 33 pp. 221-226; Jun. 29, 1997; 221-226; 33; Elsevier Science Limited.
Niels Krog; The role of low-polar emulsifiers in protein-stabilized food emulsions; Kluwer; 1992; 61-74; vol. 363 No 19.
M. Dervisoglu and F. Yazici; The Effect of Citrus Fibre on the Physical, Chemical and Sensory Properties of Ice Cream; Food Science and Technology International; Apr. 2006; pp. 159-164—with abstract; 12.
Search report in EP14193055; dated Sep. 1, 2015.
Written Opinion in EP14193055; dated Sep. 1, 2015.
Search Report & Written Opinion in PCTEP2015075745; dated Jan. 21, 2016.
Crizel et al.; Orange fiber as a novel fat replacer in lemon ice cream; Food Science and Technology, Campinas; 2014; pp. 332-340; vol. 34, No. 2.
Foster R.J.; Really cool fruit treats; Food Product Design; 2008; pp. 36-45; vol. 18 No 4.
Jana A. H. ; Joshi N. S. S. ; Sharma A. M.; Sweeteners for frozen success: a review; Australian Journal of Dairy Technology; 1994; pp. 98-109; vol. 49, No. 2.
S. A. Wittinger and D. E. Smith; Effect of Sweeteners and Stabilizers on selected Sensory Attributes and Shelf Life of Ice Cream; Journal of Food Science ; Nov. 1986; pp. 1463-1466; vol. 51, Issue 6.
J.M. Aleong, S. Frochot and H.D. Goff; Ice Recrystallization Inhibition in Ice Cream by Propylene Glycol Monostearate; Journal of Food Science; 2008; pp. E463-E468; vol. 73, No. 9.
Hopkinson, Jonathan; Frozen novelties; Handbook of Food Products Manufacturing; 2007; pp. 635-645; vol. 2.
H.D. Goff, K. Montoya and M.E. Sahagian; The Effect of Microstructure on the Complex Glass Transition Occurring in Frozen Sucrose Model Systems and Foods; Amorphous food and pharmaceutical systems: proceedings of a conference; 2002; pp. 145-157.
N. Dubash et al.; Conditions for static bubbles in viscoplastic fluids; Physics of Fluids; 2004; pp. 4319-4330; vol. 16 No. 12.
Paola Emila Cicerone; What happened to Grand Soleil? The sorbet Ferrero has disappeared from supermarket shelves a year ago, after six years of testing; Ferrero Grand Soleil; Jan. 3, 2015; Retrieved from the internet on Apr. 24, 2017; http://www.ilfattoalimentare.it/gran-solell.html; Publicly available prior to Nov. 2013, pp. 1.
Written Opinion in EP14193058; dated Sep. 8, 2015.
Dong Haizhou et al.; Food is the first necessity of the people, Food Processing vol., pp. 339, Shandong Science and Technology Press, Apr. 2007; pp. 339; Shandong Science and Technology Press.
Luo Hongxia et al.; Dairy processing technology, pp. 119, China Quality Publishing House, Jul. 2012; pp. 119; China Quality Publishing House.
Xue Xiaoxian et al.; Dairy processing technology and formula,; Scientific and Technological Literature Publishing House; Nov. 2004; 2 pages (Chinese version only); Scientific and Technological Literature Publishing House.
Liang Ping and Long Xinfeng; Heat Utilization of Orimulsion, South China University of Technology Press, 2006, pp. 34-35; Jul. 31, 2006.
Xia Wenshui; Food Processing Technology; China Light Industry Press Ltd; Jan. 2007; pp. 366.
English Translation of China Office Action for Application Serial No. 201580061711.2 dated Dec. 6, 2019.
Co-pending U.S. Appl. No. 17/296,963; filed May 25, 2021, entitled Frozen Confection.
Co-pending U.S. Appl. No. 15/524,876; filed May 5, 2017, entitled Composition for Preparing a Frozen Confection.
Co-pending U.S. Appl. No. 16/616,822; filed Nov. 25, 2019, entitled Packages Frozen Confection.
Chris Clarke, The Science of Ice Cream, The Royal Society of Chemistry, Chapter 7, pp. 135-154, Oct. 2004.
Inoue et al., Effects of Manufacturing Process Conditions of Sensory Attributes and Microstructure of Ice Cream, Sensors and Materials, vol. 24, No. 5, pp. 245-260, Accepted Jul. 4, 2011 (2012).
Tharp & Young, On Ice Cream, retrieved from the Internet http://www.onicecream.com/qa_sweetness.html; Apr. 2001.
How Products Are Made, Freeze-Dried Food, retrieved from the Internet http://www.madehow.com/Volume-2/Freeze-Dried-Food.html; Mar. 2006.
Goudappel et al.; Measurement of Oil Droplet Size Distributions in Food Oil/Water Emulsions by Time Domain Pulsed Field Gradient NMR; Journal of Colloid and Interface Science; 2001; 535-542; vol. 239.

\* cited by examiner

FROZEN CONFECTION

FIELD OF THE INVENTION

The present invention relates to frozen confections such as ice cream. In particular, the invention relates to frozen confections that are formulated to be dispensed from containers at low temperatures.

BACKGROUND OF THE INVENTION

In recent years, systems for dispensing frozen confections such as soft ice cream have been developed in which pre-packaged ice cream is delivered from a container by a dispensing device. In particular systems which employ bag-in-bottle type containers or piston-type cartridges have been developed.

WO 2013/124193 A discloses a method for dispensing a frozen confection comprising: providing a refrigerated, insulated chamber, which houses at least one container, containing a frozen confection at a temperature of −12° C. or below; wherein the at least one container has an outlet which is closed by a self-closing valve; wherein the container comprises a flexible bag containing the frozen confection located inside a bottle; pressurising gas in the region inside the bottle and outside the flexible bag thereby applying pressure to the frozen confection so that the valve opens and the frozen confection is forced out of the container through the outlet; releasing the pressure so that the valve closes.

Such systems typically employ frozen confections that are specifically formulated to be dispensed at the desired low temperatures.

US 2004/0161503 A discloses a frozen product comprising a cartridge containing a frozen aerated confection having an overrun of above 20 percent and below 100 percent, and containing less than 1.5 percent w/w glycerol, freezing point depressants in an amount of between 25 percent and 37 percent w/w, and between 2 and 12 percent fat, wherein the freezing point depressants have a number average molecular weight $\langle M \rangle_n$ of less than 300. The frozen aerated confection has a soft structure and can be extruded from the cartridge at −18 degrees centigrade.

WO 03/096821 A discloses a frozen aerated product in a container, the container having at least two compartments (A) and (B), said compartments being gastighlty separated from each other by an at least partially movable wall, compartment (A) containing a propellant and compartment (B) containing the frozen aerated product, compartment (B) being provided with a valve, wherein the frozen aerated product contains freezing point depressants in an amount of between 20 percent and 40 percent w/w and between 0 percent and 15 percent fat, the freezing point depressants having a number average molecular weight $\langle M \rangle_n$ following a certain condition.

The present inventors have now recognized that there is a need for improvements in formulations for use in systems for dispensing frozen confections like soft ice. In particular the present inventors have found that there is a need for confections which have a rheology that is less temperature dependent and so can be extruded at low temperatures but which has the desired structure when extruded at higher temperatures. This is important as commercial and domestic storage freezers have variable storage temperatures. The inventors have found that improved confections can be provided when they are formulated with a specific amount and type of freezing point depressants and wherein the freezing point depressants comprise a specific amount of erythritol.

Erythritol (butane-1,2,3,4-tetraol) is a sugar alcohol that has been used as a sweetener and sugar-replacer in dietetic foods.

WO 98/16120 A discloses a sherbet which contains erythritol and has a soft texture; and a process for the production thereof. This is said to provide a low-calorie sherbet which exhibits a low hardness in a frozen state even though it contains erythritol, and therefore has a soft texture permitting easy penetration of a spoon even just after it has been taken out of a freezer.

EP 0 965 277 A discloses an iced dessert comprising erythritol as sweetening and texture agent, and an agent for controlling the melt of the ice dessert selected from dextrins and/or non-digestible dextrins. The iced desserts are particularly formulated without added sugar.

Neither of the foregoing documents concern frozen confections formulated to be dispensed from containers at a range of temperatures.

Tests and Definitions

Average Molecular Weight

For the purposes of the present invention, the average molecular weight for a mixture of freezing point depressants is defined by the number average molecular weight $\langle M \rangle_n$ (Equation 1). Where $w_i$ is the mass of species i, $M_i$ is the molar mass of species i and $N_i$ is the number of moles of species i of molar mass $M_i$.

$$\langle M \rangle_n = \frac{\sum w_i}{\sum (w_i / M_i)} = \frac{\sum N_i M_i}{\sum N_i} \quad \text{(Equation 1)}$$

Freezing Point Depressants

Freezing point depressants as defined in this invention consist in:

- monosaccharides and disaccharides
- oligosaccharides containing from three to ten monosaccharide units joined in glycosidic linkage.
- corn syrups with a dextrose equivalent (DE) of greater than 20 preferably >40 and more preferably >60. Corn syrups are complex multi-component sugar mixtures and the dextrose equivalent is a common industrial means of classification. Since they are complex mixtures their number average molecular weight $\langle M \rangle_n$ can be calculated from Equation 2 below. (*Journal of Food Engineering*, 33 (1997) 221-226)

$$DE = \frac{18016}{\langle M \rangle_n} \quad \text{(Equation 2)}$$

erythritol, arabitol, glycerol, xylitol, sorbitol, mannitol, lactitol and malitol.

ethanol.

Overrun.

Overrun (OR) is defined by the following Equation 3

$$OR = \frac{\text{volume ... of ... frozen ... confection} - \text{volume ... of ... premix ... at ... ambient ... } temp}{\text{volume ... of ... premix ... at ... ambient ... } temp} \times 100 \quad \text{(Equation 3)}$$

It is measured at atmospheric pressure. Ambient temperature is 20° C.

SUMMARY OF THE INVENTION

In a first aspect, the present invention is directed to a frozen confection comprising freezing point depressants in an amount of from 25 to 35% by weight of the frozen confection, wherein the number average molecular weight $<M>_n$ of the freezing point depressants is from 200 to 250 g mol$^{-1}$, and wherein the freezing point depressants comprise erythritol in an amount of from 0.25 to 7% by weight of the frozen confection.

The amount of ice in the product is determined, to a large extent by the amount and molecular weight of the freezing point depressants. The present inventors have found that if the amount of ice is too high, then regardless of the presence of erythritol, the confection becomes too difficult to extrude at low temperatures found in some storage freezers (for example −22° C.). Thus the freezing point depressants have a number average molecular weight $<M>_n$ of no more than 250 g mol$^{-1}$, and are present in an amount of at least 25% by weight of the frozen confection.

Preferably the amount of freezing point depressants is at least 26%, more preferably at least 27% by weight of the frozen confection.

Preferably the number average molecular weight $<M>_n$ of the freezing point depressants is no more than 240, more preferably no more than 230 and most preferably no more than 220 g mol$^{-1}$.

On the other hand if the amount of freezing point depressants becomes too high and/or their molecular weight becomes too low then the rheology will be too liquid-like at higher temperatures encountered in some storage freezers (for example −16° C.). Thus the freezing point depressants have a number average molecular weight $<M>_n$ of no less than 200 g mol$^{-1}$, and are present in an amount of no more than 35% by weight of the frozen confection.

Preferably the amount of freezing point depressants is no more than 32%, more preferably no more than 31% and most preferably no more than 30% by weight of the frozen confection.

Preferably the number average molecular weight $<M>_n$ of the freezing point depressants is no less than 205, more preferably no less than 210 and most preferably no less than 212 g mol$^{-1}$.

The present inventors have found that erythritol is particularly effective at imparting the desired rheological properties to the frozen confection. In addition, in comparison to some other sugar alcohols, erythritol does not impart an unpleasant off-taste, is not overly sweet and does not interfere with natural digestion and excretion of food.

Preferably the amount of erythritol is at least 0.5%, more preferably at least 0.7% and most preferably at least 1% by weight of the frozen confection.

Preferably the amount of erythritol is not too high, otherwise the confection may be too liquid-like and/or it may be difficult to formulate the confection with the desired sweetness. Thus it is preferred that the amount of erythritol is no more than 6%, more preferably no more than 5%, more preferably still no more than 4% and most preferably no more than 3% by weight of the frozen confection.

Other than erythritol, it is preferred that the freezing point depressants are substantially comprised of saccharides. Preferably the freezing point depressants comprise at least 90% by weight of the freezing point depressants of mono, di and oligosaccharides, more preferably at least 92%. The total amount of mono, di and oligosaccharides and erythritol in the freezing point depressants is preferably at least 98% by weight of the freezing point depressants, more preferably 99 to 100%.

An especially preferred disaccharide is lactose as this provides freezing point depression without imparting a high amount of sweetness. Preferably the freezing point depressants comprise lactose in an amount of at least 5% by weight of the freezing point depressants, more preferably from 10 to 25% by weight of the freezing point depressants. The lactose may be present in the confection as part of milk solids and/or added separately from milk solids.

Certain freezing point depressants are undesirable as they impart unwanted taste and/or physiological effects.

Preferably the frozen confection comprises less than 0.5% ethanol by weight of the frozen confection, more preferably less than 0.1% and more preferably still less than 0.01%, and most preferably 0%.

Preferably the frozen confection comprises less than 1.5% glycerol by weight of the frozen confection, more preferably less than 1% and more preferably still less than 0.5%, and most preferably from 0.2 to 0%. Additionally or alternatively the total amount of arabitol, glycerol, xylitol, sorbitol, mannitol, lactitol and malitol in the frozen confection is less than 1.5% by weight of the frozen confection, more preferably less than 1% and more preferably still less than 0.5%, and most preferably from 0.2 to 0%.

Preferably the frozen confection comprises less than 5% fructose by weight of the frozen confection, more preferably less than 3% and most preferably from 0 to 2%.

Preferably the freezing point depressant impart the desired sweetness to the frozen confection without the need to use intense sweetener. By "intense sweetener" is meant one or more of aspartame, saccharin, acesulfame K, alitame, thaumatin, cyclamate, glycyrrhizin, stevioside, neohesperidine, sucralose, monellin, and neotame. Preferably the frozen confection is substantially free from intense sweetener. More preferably the frozen confection comprises intense sweetener in an amount less than the amount required to impart an equivalent sweetness as 1% sucrose, more preferably less than the amount required to impart an equivalent sweetness as 0.5% sucrose, and most preferably less than the amount required to impart an equivalent sweetness as 0.1% sucrose. Additionally or alternatively, the frozen confection comprises less than 0.003% intense sweetener, more preferably less than 0.001% and most preferably from 0.0001 to 0%.

The present invention is applicable to a range of frozen confections and despite the presence of erythritol the frozen confection need not be dietetic. For example the total energy content of the frozen confection is preferably at least 150 kcal per 100 g of frozen confection, more preferably at least 170 kcal per 100 g and most preferably from 160 to 250 kcal/100 g.

The frozen confection is typically made by freezing a mix (more preferably a pasteurized mix) of ingredients such as water, fat, freezing point depressants, protein (normally milk proteins), and optionally other ingredients such as emulsifiers, stabilisers, colours and flavours. Frozen confections include ice cream, gelato, frozen yoghurt, sorbets, granitas, shaved ices and the like. Preferably the frozen confection is ice cream.

The frozen confection is preferably aerated. By "aerated" is meant that the confection has an overrun of at least 30%. More preferably the frozen aerated confection has an overrun of from 70 to 135%, most preferably from 80 to 110%.

The frozen confection preferably comprises fat in an amount of from 1 to 15% by weight of the frozen confection, more preferably from 4 to 12%, and most preferably from 5 to 10%.

The frozen confection preferably comprises protein in an amount of from 0.5 to 8% by weight of the frozen confection, more preferably from 1 to 6%, and most preferably from 1.5 to 5%.

The frozen confection is formulated to be dispensed from a container. Thus in a second aspect the present invention is directed to a frozen product comprising a container comprising a product compartment containing the frozen confection according to any embodiment of the first aspect, wherein the product compartment comprises a product outlet and a moveable wall through which a dispensing force can be transmitted to urge the frozen confection through the product outlet.

The moveable wall is such that a dispensing force can be transmitted through the wall to the frozen confection. Examples of containers comprising a moveable wall include bag-in-bottles (where the bag acts as the moveable wall) and cartridges containing pistons (where the piston acts as the moveable wall) although other configurations are possible including, for example, containers with an end wall that is deformable to become the moveable wall (as described, for example in U.S. Pat. No. 5,893,485). Examples of bag-in-bottle type containers are described in WO 2007/039158 A and examples of piston-in-cartridge type containers are described in EP 1 449 441 A both of which documents are hereby incorporated by reference in their entirety. Most preferred are bag-in-bottle type containers.

In one embodiment the container is adapted such that the wall is moveable on application of hand pressure. For example the container may comprise a pouch that is squeezable by hand. Suitable pouches are described, for example in WO 2006/007921 A hereby incorporated by reference in its entirety.

Except in the Examples, all numbers in this description indicating amounts of material, time periods, length scales, conditions of reaction, physical properties of materials and/or use may optionally be understood as modified by the word "about".

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

Where a feature is disclosed with respect to a particular aspect of the invention such disclosure is also to be considered to apply to any other aspect of the invention mutatis mutandis.

DETAILED DESCRIPTION

The present invention will now be described, by way of example only, with reference to the following Examples.

Example 1

Ice creams were formulated with varying ice contents (as calculated at −18° C.) and erythritol amounts as shown in Table 1 (amounts in % w/w).

TABLE 1

|  | A | B | C | 1 | 2 | 3 |
| --- | --- | --- | --- | --- | --- | --- |
| Coconut oil | 8.00 | 8.00 | 8.00 | 8.00 | 8.00 | 8.00 |
| Skimmed milk, powder | 4.15 | 4.15 | 4.15 | 4.15 | 4.15 | 4.15 |
| Whey protein, concentrate (30%) | 2.73 | 2.73 | 2.73 | 2.73 | 2.73 | 2.73 |
| Low Fructose Corn Syrup (63 DE) | 6.00 | 5.00 | 10.00 | 7.80 | 14.50 | 9.80 |
| Dextrose monohydrate | 12.40 | 11.62 | 15.00 | 14.26 | 9.30 | 14.88 |
| Sucrose | 4.60 | 4.60 | 2.00 | 2.40 | 2.00 | 1.70 |
| Erythritol | 0.00 | 2.00 | 0.00 | 1.40 | 5.00 | 1.40 |
| Locust Bean Gum | 0.25 | 0.25 | 0.25 | 0.25 | 0.25 | 0.25 |
| Kappa Carrageenan | 0.02 | 0.02 | 0.02 | 0.02 | 0.02 | 0.02 |
| Monodiglyceride | 0.40 | 0.40 | 0.40 | 0.40 | 0.40 | 0.40 |
| Flavour | 0.28 | 0.28 | 0.28 | 0.28 | 0.28 | 0.28 |
| Colour | 0.01 | 0.01 | 0.01 | 0.01 | 0.01 | 0.01 |
| Water | to 100 | to 100 | to 100 | to 100 | to 100 | to 100 |

The properties of the formulations are shown in Table 2.

TABLE 2

|  | A | B | C | 1 | 2 | 3 |
| --- | --- | --- | --- | --- | --- | --- |
| Ice Content (% w/w) | 47 | 45 | 42 | 42 | 35 | 40 |
| Freezing Point Depressants (% w/w) | 24.3 | 24.9 | 27.2 | 26.6 | 30.6 | 28.1 |
| $<M>_n$ (g mol$^{-1}$) | 235 | 220 | 227 | 217 | 212 | 217 |
| Erythritol (% w/w) | 0 | 2.0 | 0 | 1.4 | 5.0 | 1.4 |
| Energy (kcal/100 g) | 184 | 178 | 195 | 187 | 189 | 193 |

The ice creams were prepared by pasteurizing and homogenizing mixes prepared according to the above formulations. The mixes were aged at 4° C. overnight before freezing and aerating in a scraped surface heat exchanger (standard ice cream freezer). The air input to the freezer was controlled to give a target overrun of 100% (actual overrun varied between 92 and 110%). Freezing was controlled to give a target extrusion temperature of −7° C. (actual extrusion temperature varied between −6 and −9° C.).

The mixes were extruded directly into aluminium rheology cups and bag-in-bottle containers. The cups and containers were then hardened to −25° C. for storage.

Example 2

This example describes measurement of the rheology of the ice cream samples prepared in Example 1 as a function of temperature.

Preceding the rheological measurements, the samples in the rheology cups were equilibrated overnight in a portable freezer set at the temperature of interest.

All measurements were performed on an Anton Paar MCR 501 rheometer, which was connected to a double circulating bath for temperature control. The rheometer consisted of a temperature controlled sample holder and a hood to cover the sample. Cold air was blown onto the sample, via the hood, to prevent condensation and frost formation. A vane 10-4V-8.8/116 geometry was used, which is a 4-blade vane with a diameter of 8.8 mm, a height of 10 mm and a shaft length of 116 mm.

Before insertion of the sample, the vane was lowered to the measurement position to equilibrate the vane, sample holder and hood to the test temperature—either −14, −16, −18, −20, or −22° C. The measurement position was set at 10 mm. After equilibration a rheology cup containing the sample was inserted into the sample holder and the hood was lowered until it touched the base. The wall of the rheology cup was serrated to prevent wall slip. The vane was then further lowered into the measurement position at a very slow speed of 100 μm per second to not damage the structure of the sample too much.

Before the measurement commenced, the sample was equilibrated for 20 minutes to allow for internal structure recovery and final equilibration to the test temperature. An oscillatory amplitude sweep test was performed on all samples, controlled by Rheoplus software. A strain range of 0.001% to 100% was imposed with 10 points per decade on a log scale at a frequency of 10 Hz. The measurement point duration was fixed at 20 s. All measurements were performed in triplicate with a new sample being used for every measurement.

The yield stress was obtained from the data, as this is an indicator for the flowability of the ice cream. The yield stress was determined by finding the highest value of the elastic stress before the cross-over point between the elastic stress and the viscous stress. Elastic Stress is calculated by multiplying the storage (elastic) modulus by the strain and viscous Stress is calculated by multiplying the loss (viscous) modulus by the strain. Table 3 shows the mean yield stress for each sample as a function of temperature (values in brackets are the standard error). Also given is the ratio (R) of yield stress at −22° C. to the yield stress at −16° C. for each sample.

The ratio (R) gives an indication of the temperature-dependence of the flowability of the samples over the temperature range typical of domestic and commercial storage freezers (−16 to −22° C.). The higher the value, the more variable the flowability. It can be seen from the data in Table 3 that for the samples containing erythritol (Samples B, 1, 2 and 3) the yield stress varied by a factor of 2 or less over the temperature range −16 to −22° C. On the other hand, for the samples without erythritol (Samples A and C) the yield stress varied by well over a factor of 2 over the same temperature range. Sample C has the same ice content (at −18° C.) as Sample 1 but lacks erythritol and shows a greater temperature dependence of yield stress than Sample 1.

TABLE 3

| | Yield Stress (Pa) | | | | | |
|---|---|---|---|---|---|---|
| Sample | −14° C. | −16° C. | −18° C. | −20° C. | −22° C. | R |
| A | 4543 (32) | 5481 (198) | 6115 (402) | 8112 (227) | 13615 (804) | 2.5 |
| B | 3643 (59) | 4637 (119) | 5290 (21) | 6068 (296) | 8778 (319) | 1.9 |
| C | 2941 (12) | 4067 (220) | 4820 (112) | 5842 (291) | 9183 (295) | 2.3 |
| 1 | 2445 (49) | 3342 (7) | 4289 (78) | 5146 (59) | 6657 (175) | 2.0 |
| 2 | 1733 (34) | 2489 (41) | 3336 (32) | 4326 (64) | 5094 (46) | 2.0 |
| 3 | 2701 (253) | 3764 (333) | 4865 (266) | 6446 (337) | 7600 (346) | 2.0 |

Example 3

This example describes measurement of how easily some of the samples of Example 1 can be dispensed.

Bag-in-bottle containers of four of the samples from Example 1 were tempered at −19° C. and then dispensed using an apparatus as described in WO 2013/124193 A. Each container contained around 2 kg of ice cream. The flow rate of ice cream was determined by measuring the mass dispensed in 5 seconds. The results are shown in Table 4.

TABLE 4

| Sample | Ice Content (% w/w) | Erythritol Content (% w/w) | Mass flow rate (g per 5 s) |
|---|---|---|---|
| A | 47 | 0 | 0.0 |
| B | 45 | 2.0 | 0.0 |
| C | 42 | 0 | 71.4 |
| 1 | 42 | 1.4 | 240.0 |

Neither sample A nor B could be dispensed at this temperature. Both of these samples have freezing point depressant levels that give ice contents of 45% and above (at −18° C.). At an ice content of 42%, both the sample with (Sample 1) and without (Sample C) erythritol could be dispensed but the Sample containing erythritol had the most acceptable flow rate.

The invention claimed is:

1. A frozen confection comprising freezing point depressants in an amount of from 25 to 35% by weight of the frozen confection, wherein the number average molecular weight of the freezing point depressants is from 200 to 250 g mol$^{-1}$, and wherein the freezing point depressants comprise erythritol in an amount of from 0.25 to 7% by weight of the frozen confection wherein the total amount of arabitol, glycerol, xylitol, sorbitol, mannitol, lactitol, and maltitol in the frozen confection is less than 1.5% by weight of the frozen confection.

2. The frozen confection as claimed in claim 1 wherein the frozen confection is aerated and wherein the frozen aerated confection has an overrun of from 70 to 135%.

3. The frozen confection as claimed in claim 2 wherein the frozen confection is aerated and wherein the frozen aerated confection has an overrun of from 100 to 135%.

4. The frozen confection as claimed in claim 1 wherein the amount of freezing point depressants is from 26 to 32% by weight of the frozen confection.

5. The frozen confection as claimed in claim 1 wherein the number average molecular weight of the freezing point depressants is from 205 to 230 g mol$^{-1}$.

6. The frozen confection as claimed in claim 1 wherein the amount of erythritol is from 0.5 to 6% by weight of the frozen confection.

7. The frozen confection as claimed claim 1 wherein the freezing point depressants comprise at least 90% by weight of the freezing point depressants of mono, di and oligosaccharides.

8. The frozen confection as claimed in claim 7 wherein the total amount of mono, di and oligosaccharides and erythritol in the freezing point depressants is at least 98% by weight of the freezing point depressants.

9. The frozen confection as claimed in claim 1 wherein the freezing point depressants comprise lactose in an amount of at least 5% by weight of the freezing point depressants.

10. The frozen confection as claimed in claim 1 wherein the frozen confection comprises less than 0.5% ethanol by weight of the frozen confection.

11. The frozen confection as claimed in claim 1 wherein the frozen confection comprises fat in an amount of from 1 to 15% by weight of the frozen confection.

12. The frozen confection as claimed in claim 1 wherein the frozen confection comprises protein in an amount of from 0.5 to 8% by weight of the frozen confection.

13. A frozen product comprising a container comprising a product compartment containing the frozen confection as claimed in claim 1, wherein the product compartment comprises a product outlet and a moveable wall through which a dispensing force can be transmitted to urge the frozen confection through the product outlet.

14. The frozen product as claimed in claim 13 wherein the movable wall is a bag.

15. The frozen product as claimed in claim 14 wherein the container is a bag-in-bottle.

16. The frozen product according to claim 1 wherein a ratio (R) of (x) yield stress at −22° C. to (y) the yield stress at −16° C. is 2 or below.

17. The frozen product according to claim 1 not having an ice level of 45% or above at −18° C.

18. The frozen product according to claim 17 having an ice level of from 35 to 42% at −18° C.

19. The frozen product according to claim 1 comprising from 0 to 0.2 wt % glycerol.

* * * * *